(12) United States Patent
Cakmakci et al.

(10) Patent No.: US 7,499,217 B2
(45) Date of Patent: Mar. 3, 2009

(54) IMAGING SYSTEMS FOR EYEGLASS-BASED DISPLAY DEVICES

(75) Inventors: Ozan Cakmakci, Orlando, FL (US); Jannick Rolland, Chuluota, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 332 days.

(21) Appl. No.: 11/398,277

(22) Filed: Apr. 5, 2006

(65) Prior Publication Data

US 2007/0236800 A1 Oct. 11, 2007

Related U.S. Application Data

(60) Provisional application No. 60/779,012, filed on Mar. 3, 2006.

(51) Int. Cl.
*G02B 27/14* (2006.01)

(52) U.S. Cl. ..................................................... 359/630

(58) Field of Classification Search .................. 351/41, 351/158; 359/630–640
See application file for complete search history.

(56) References Cited

U.S. PATENT DOCUMENTS

| | | | |
|---|---|---|---|
| 4,026,641 A | 5/1977 | Bosserman et al. ......... 350/298 |
| 4,704,000 A | 11/1987 | Pekar et al. .................. 350/145 |
| 4,753,514 A | 6/1988 | Kubik .......................... 350/174 |
| 4,806,011 A | 2/1989 | Bettinger ..................... 351/158 |
| 4,867,551 A | 9/1989 | Perera ......................... 351/158 |
| 5,003,300 A | 3/1991 | Wells ........................... 340/705 |
| 5,129,716 A | 7/1992 | Holakovszky et al. ......... 351/50 |
| 5,162,828 A | 11/1992 | Furness et al. .............. 353/122 |
| 5,184,250 A | 2/1993 | Lacroix ....................... 359/631 |
| 5,309,169 A | 5/1994 | Lippert ........................... 345/8 |
| 5,384,654 A | 1/1995 | Iba .............................. 359/364 |
| 5,436,765 A | 7/1995 | Togino ........................ 359/631 |
| 5,576,887 A | 11/1996 | Ferrin et al. ................. 359/631 |
| 5,886,822 A * | 3/1999 | Spitzer ........................ 359/630 |
| 5,991,103 A | 11/1999 | Togino ........................ 359/834 |
| 6,081,304 A | 6/2000 | Kuriyama et al. ........... 348/838 |
| 6,307,526 B1 | 10/2001 | Mann ............................. 345/8 |
| 6,342,871 B1 | 1/2002 | Takeyama ....................... 345/7 |
| 6,353,503 B1 | 3/2002 | Spitzer et al. ............... 359/630 |
| 6,359,602 B1 | 3/2002 | Amafuji et al. ................. 345/8 |
| 6,697,200 B2 | 2/2004 | Nagaoka ..................... 359/630 |
| 6,771,423 B2 | 8/2004 | Geist ........................... 359/630 |
| 2003/0086135 A1 | 5/2003 | Takeyama | |

* cited by examiner

*Primary Examiner*—Hung X Dang
(74) *Attorney, Agent, or Firm*—Thomas, Kayden, Horstemeyer & Risley, LLP

(57) ABSTRACT

Disclosed are imaging systems and eyeglass-based display devices. In one embodiment, an imaging system includes an image source and a partial mirror that defines a non-rotationally symmetric surface, wherein the partial mirror reflects images generated by the image source to an eye of an observer.

38 Claims, 8 Drawing Sheets ns for eyeglass-based
IMAGING SYSTEMS FOR EYEGLASS-BASED DISPLAY DEVICES

CROSS-REFERENCE TO RELATED APPLICATION

This application claims priority to U.S. provisional application entitled, "Systems and Methods for Providing A Lightweight Visual Display In An Eyeglass Formware," filed Mar. 3, 2006, having Ser. No. 60/779,012.

BACKGROUND

The emergence of various technologies have given rise to a need for wearable displays. For example, virtual and augmented reality environments, wireless networks, miniaturization of electronic devices, and mobile computing devices such as personal digital assistants (PDAs) and mobile telephones have created a need for wearable displays with which device users can interface and, in at least some cases, carry with them as they move from place to place.

Head-worn displays, often referred to as head-mounted displays (HMDs), have existed for many years. Generally speaking, those HMDs have not been commercially adopted due to one or more of their size, bulk, complexity, or expense. Given the drawbacks of existing HMD designs, there is an interest in developing eyeglass-based display devices that have the general form factor of eyeglasses and can be worn in similar manner to conventional eyeglasses or sunglasses. Such eyeglass-based display devices would be less obtrusive than previous HMDs and more portable.

There are several challenges to developing an eyeglass-based display device that is likely to be adopted by the public. Successful designs will combine relatively light weight, compactness, and desirable aesthetics. Although achieving a design that combines those attributes is itself difficult, even more difficult is providing those attributes while also delivering acceptable image quality.

SUMMARY

Disclosed are imaging systems and eyeglass-based display devices. In one embodiment, an imaging system comprises an image source and a partial mirror that defines a non-rotationally symmetric surface, wherein the partial mirror reflects images generated by the image source to an eye of an observer.

BRIEF DESCRIPTION OF THE FIGURES

The components in the drawings are not necessarily to scale, emphasis instead being placed upon clearly illustrating the principles of the present disclosure. In the drawings, like reference numerals designate corresponding parts throughout the several views.

DETAILED DESCRIPTION

Introduction

Figure 1:
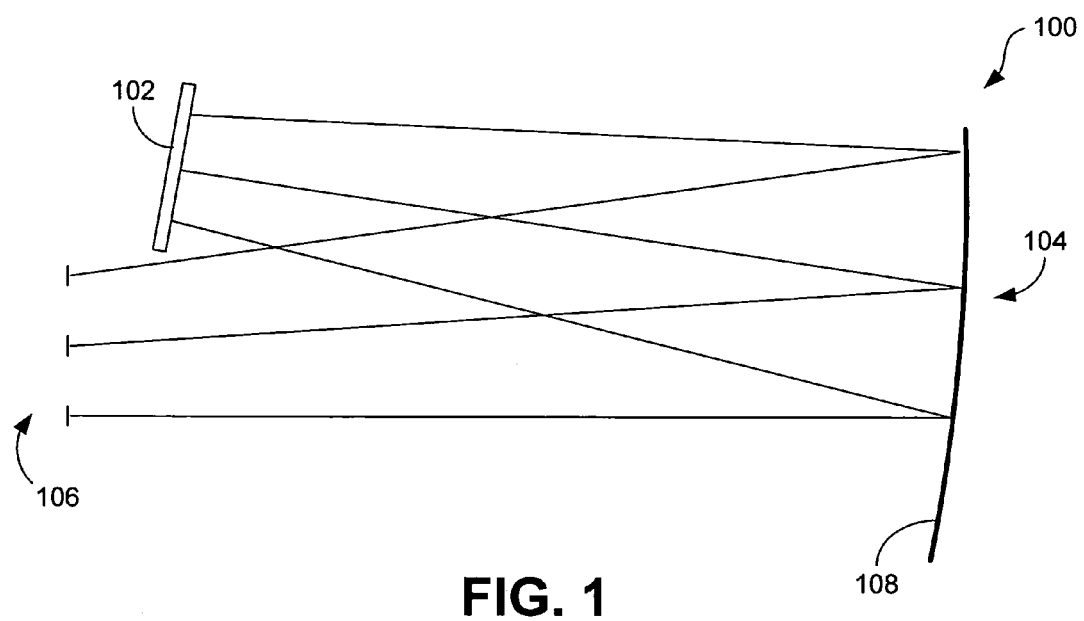
FIG. 1 is an optical layout of a first embodiment of an imaging system designed for use in an eyeglass-based display device.

As described above, the emergence of various technologies have given rise to a need for wearable displays. Although head-mounted displays (HMDs) have existed for many years, those HMDs have not been broadly adopted due to various factors. Given the drawbacks of existing HMD designs, there is an interest in developing eyeglass-based display devices that have the general form factor of eyeglasses. There are several challenges to developing an eyeglass-based display device that is likely to be adopted by the public. One of the challenges is providing an eyeglass-based display device that combines relatively light weight and compactness that also delivers acceptable image quality.

Disclosed herein are imaging systems and eyeglass-based display devices that comprise relatively few optical elements. Due to the relatively small number of optical elements used, the imaging systems can, in at least some cases, be integrated into the form factor of conventional eyeglasses or sunglasses. Due to the nature of the optical elements that are used in the imaging systems, high-quality images can be produced.

In the following, described are various considerations for the HMD imaging system design process followed by descriptions of particular embodiments of imaging systems and eyeglass-based display devices. Although particular embodiments of imaging systems and display devices are described, the disclosed systems and devices are not limited in their application to those particular embodiments. Instead, the described embodiments are mere example implementations of the disclosed systems and devices. Furthermore, the terminology used in this disclosure is selected for the purpose of describing the disclosed systems and devices and is not intended to limit the breadth of the disclosure.

Optical System Design Considerations

Ideally, optical systems for HMDs, including eyeglass-based display devices, are designed for each specific application, and the requirements of each application guide the design process. Example specifications such as the usage of the display indoors, outdoors, or both will determine the brightness of the image source necessary. Image source spectrum combined with the spectral response of the human eye at the ambient illumination level of interest (e.g., scotopic or photopic) determines the spectral band of operation, which can be made narrower based on the application.

Field of view is another important design specification. For example, a compact text-based display used for reading electronic mail messages could be monocular and may require less field of view whereas an immersive training application could require a stereo display with wider fields of view. Therefore, it is important to set the field of view based on the task and informed by the functioning of the visual pathways. However, independent of the target application, the optical systems for HMDs should meet some minimum requirements in terms of factors such as eye clearance, exit pupil size, image quality, and spectral characteristics.

Light throughput limitations and design tradeoffs in HMDs related to the exit pupil size and the field of view can be understood by applying the Lagrange invariant, the derivation of which can be found in many classical geometrical optics textbooks. The Lagrange invariant (LI), axiomatically stated and applied to the pupils, can be written as follows:

$$LI = n\bar{u}y_{pupil} = n'\bar{u}'y'_{pupil} \quad \text{[Equation 1]}$$

where $\bar{u}$ represents the chief ray angle at the entrance pupil, $y_{pupil}$ is the radius of the entrance pupil, n is the refractive index in the object space, $\bar{u}'$ is the chief ray angle at the exit pupil, $y'_{pupil}$ is the exit pupil radius, and n' is the refractive index in the image space. Using Equation 1 for a fixed value of the Lagrange invariant, the field of view in image space is inversely proportional to the exit pupil height.

Light is collected from an image source, such as a microdisplay, and is redistributed onto an image plane through the imaging process. The flux constancy during imaging is also governed by the Lagrange invariant relationship. For example, the product of the solid angle subtended by the entrance pupil multiplied by the object area is equal to the product of the solid angle subtended by the exit pupil multiplied by the image area.

Another fundamental trade-off in HMDs exists between the field of view and the resolution. This tradeoff exists because a functionality of the HMD optics is to spread the pixels on the microdisplay across the field of view. Thus, as the field of view is increased, the number of pixels per degree decreases.

HMDs can be monocular where a single image is presented to a single eye, biocular where the same image is presented to both eyes, or binocular ("stereo") where two distinct images are presented to each eye. There are optical design and perceptual issues associated with each mode. HMDs can be designed in optical see-through, opaque, or video see-through modes. Important to the optical see-through and video see-through are latency, occlusion, the fidelity of the real-world view, and user acceptance. View point offset is also an important issue in all HMD modes of operation.

In optical design of HMDs, the human visual system can be characterized in terms of its object space parameters. Designing in the object space means that the aberrations of the human eye are not compensated for and the perceptual effects that result from the encoding and processing that occurs within the eye are not relied upon. Functional primary parameters of interest include the variation in pupil size under various levels of illumination, depth of field, the smallest feature size that the human eye can resolve, e.g., the resolution of the eye, the spectral characteristics of the light absorbed by the cones in the retina (for systems operating in the photopic band), and the aberration tolerances of the human eye. Binocular properties of the eye are of interest for stereo displays such as the interpupillary distance and the stereoacuity which is the threshold discrimination of depth from very small disparities.

The field of view of the human eye is 200° by 130° with a 120° overlap. The lens of the eye is a gradient index element with a higher index at the center. Front focal length of the eye is about 17 millimeters (mm) and the rear focal length is about 23 mm, the difference being due to the fact that the refractive index of the vitreous material is 1.336. Most of the optical power is provided by the cornea, although, depending on age, the lens can contribute a 10 diopter optical power change in order to focus on closer objects. The first order parameters of interest such as the location and size of the pupil, the location of the pupil, and the center of rotation are the same across these models, therefore they are equivalent for the design of HMDs.

The pupil is the optical aperture of the human eye and can change its size through dilation and contraction of the muscles in the iris. The diameter of the pupil changes from 2 mm under sunlight to about 8 mm in the dark conditions. In a recent study, the mean resting pupil size was determined to be 4.11 mm. The normal eye is considered to be near-diffraction limited for a 2 mm pupil. The entrance pupil location is about 3 mm from the vertex of the cornea and resides behind the cornea.

Binocular properties of the eye relevant to HMD design include the interpupillary distance (IPD). According to the military standard MIL-STD-1472C, the IPD adjustment range for a binocular HMD shall be 50 mm to 73 mm or greater. U.S. Air Force anthropologists measured the IPD of 4000 flying personnel and the mean yielded 63.3 mm.

Other important considerations in HMD design include brightness and contrast and their effect on depth of field, dark focus and dark vergence, accommodation-vergence synergy and its effect on perceptual constancy, eye strain and discomfort, field of view and its relationship to the functioning of different visual pathways, binocular input and its relationship to visual suppression, and head movements.

In terms of brightness and contrast, as the luminance is increased the pupil size reduces and the depth of field increases. The competing trend is that as the target resolution increases, depth of field decreases. Therefore, both the luminance level and the target resolution should be considered when designing for a specific depth of field value. Depth of field should be set appropriately so that the user can properly perceive both the computer-generated imagery and the real objects lying at the same depth. Under low levels of illumination or degraded stimulus conditions, the accommodation will rest around a 1 meter (m) value with some variation.

The human eye has evolved in such a way to converge and accommodate at the same point of interest as it saccades across the field of view. Monocular systems can present the magnified virtual image of the microdisplay at a fixed distance from the user and the information appears to reside on this single plane. The consequence is that the users can accommodate and converge on the plane of the virtual image, which is consistent with the accommodation and convergence mechanism of the human eye. Stereo displays demand that the users focus on the plane of the virtual images formed by the optics and converge at different depths away from that plane in order to perceive three dimensions. As a guideline, the human eye requires that accommodation and convergence match to within +/− 0.1 of a diopter. Accommodation and convergence conflict is known to result in eye strain and discomfort. Alignment of the optics for each eye is a critical issue in stereo displays.

When the accommodative response becomes a compromise between the stimulus and the dark focus value, depth, and speed may be misperceived. Vergence seems to be valid down to 0.02 footlamberts (fL) and the accommodation seems to be valid down to between 2 fL to 100 fL.

In terms of field of view, the human visual system seems to process two streams: a dorsal stream that connects the central and peripheral retinal areas to the magnocellular pathways and appears to be responsible for optical flow processing, and a ventral stream that connects the central retina to the parvocellular pathways, which appear to be responsible for spatial information processing such as color and spatial frequency processing. For tasks such as targeting and object recognition processed through the ventral stream, a field of view of 50° can be sufficient. For tasks requiring peripheral stimulation, larger fields of view may be required. The perceptual trade off in wider fields of view is between the level of immersion and sickness and nausea.

Monocular, partially-occluded modes of operation interrupt binocular vision and present disparate images to each eye that results in binocular rivalry. Peripheral positioning may be desirable in order to maintain normal binocular vision of the environment. Notably, under conditions of rivalry, the brighter field will dominate, while display resolution and contrast are of secondary importance for rivalry.

Imaging Systems and Eyeglass-Based Display Devices

Compactness of an eyeglass-based display device can be achieved through image magnification to increase the size of images generated by very small image sources. A simplified imaging system that provides for such magnification can comprise a single lens or a mirror used in conjunction with the image source. An example of such a system is illustrated in FIG. 1. More particularly, FIG. 1 illustrates an optical layout of an imaging system 100 based on a magnifier optical design form. The system 100 was designed with the goal of generating an image for the observer that is equivalent to a 14 inch diagonal laptop screen with a 4:3 aspect ratio at a distance of 1 m.

The imaging system 100 of FIG. 1 comprises an image source 102, in the form of a microdisplay, and a single optical element, in the form of a mirror 104 that reflects and magnifies light emitted by the image source. The mirror 104 collimates that light at the exit pupil 106 that is designed to coincide with the pupil of the eye of the observer.

The microdisplay 102 can comprise any suitable small display technology. Examples of such technologies include a liquid crystal display (LCD), a liquid crystal on silicon (LCOS) display, a light emitting diode (LED) display, an organic light emitting diode (OLED) display, or another emissive, transmissive, or reflective display technology.

The mirror 104 is configured as a partial mirror that both reflects and transmits light. The reflective mirror surface 108 comprises a freeform, non-rotationally symmetric surface. By way of example, the surface 108 is an x-y polynomial surface. Alternatively, the surface 108 can comprise a spline or a zernike (e.g., extended-fringe zernike) polynomial surface. More generally, however, substantially any linear combination of a complete and orthogonal set of basis functions can be used to form the surface 108. In the embodiment of FIG. 1, the mirror 104 is angled at approximately 6° relative to the image plane of the microdisplay 102.

Because the imaging system 100 only comprises the mirror 104 as an optical element, there is no chromatic aberration. Monochromatic aberration is corrected due to the non-rotationally symmetric surface such that excellent image quality can be attained. With this configuration, the system 100 can have a modulation transfer function that is about 20% at 40 cycles/mm for angles less than 6 degrees of tilt.

The imaging system 100 is designed to operate in the photopic regime of the spectrum, to have an effective focal length of 18.72 mm, a field of view of 16° in the x direction and 12° in the y direction, and an exit pupil size of 8 mm, and to provide an eye clearance of 17 mm to 25 mm. With such constraints, the imaging system 100 provides a diagonal field of view of approximately 20°.

Figure 2:
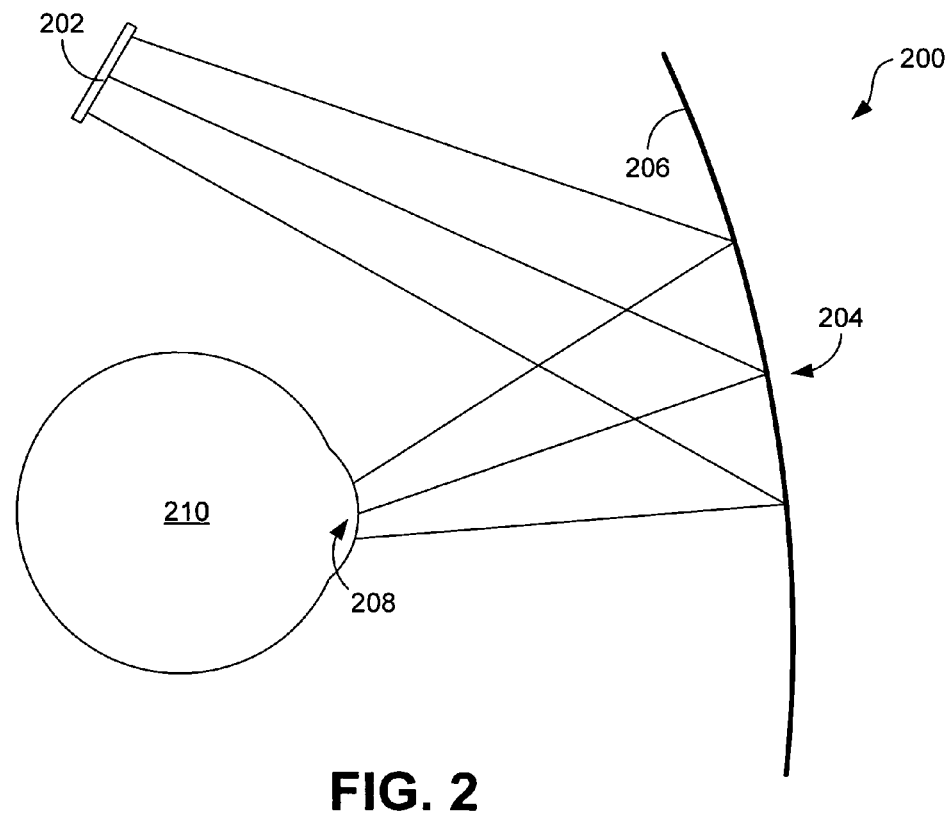
FIG. 2 is a second embodiment of an imaging system designed for use in an eyeglass-based display device.

FIG. 2 illustrates a modified embodiment of the system of FIG. 1. The imaging system 200 of FIG. 2 is formed as an off-axis arrangement that comprises each of the components of the system 100, and therefore includes an image source 202, in the form of a microdisplay, and a single optical element 204, in the form of a partial mirror. Like mirror 104, the mirror 204 comprises a freeform, non-rotationally symmetric surface 206, such as an x-y polynomial surface, that is configured to correct monochromatic aberration and reflect images generated by the microdisplay to an exit pupil 208 that is configured to coincide with the observer's eye 210. Although an x-y polynomial surface has been identified, other freeform surfaces, such as other polynomial surfaces described in the foregoing, can be used. In the embodiment of FIG. 2, the mirror 204 is set at an angle of approximately 30° to 40° relative to the image plane of the microdisplay 202.

Figure 3:
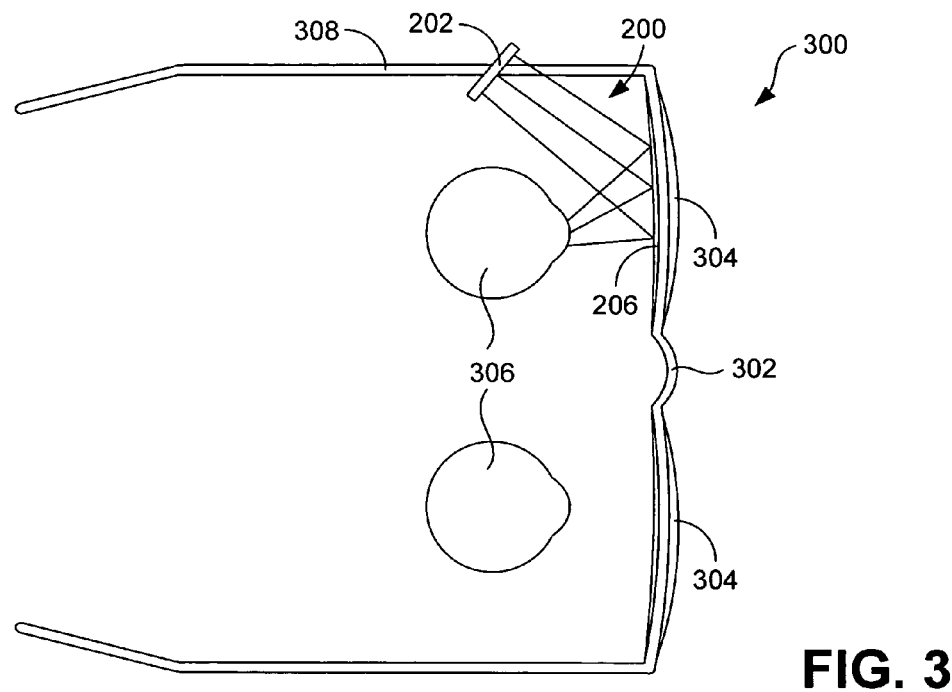
FIG. 3 is a first embodiment of an eyeglass-based display device that incorporates the imaging system of FIG. 2.
Figure 4:
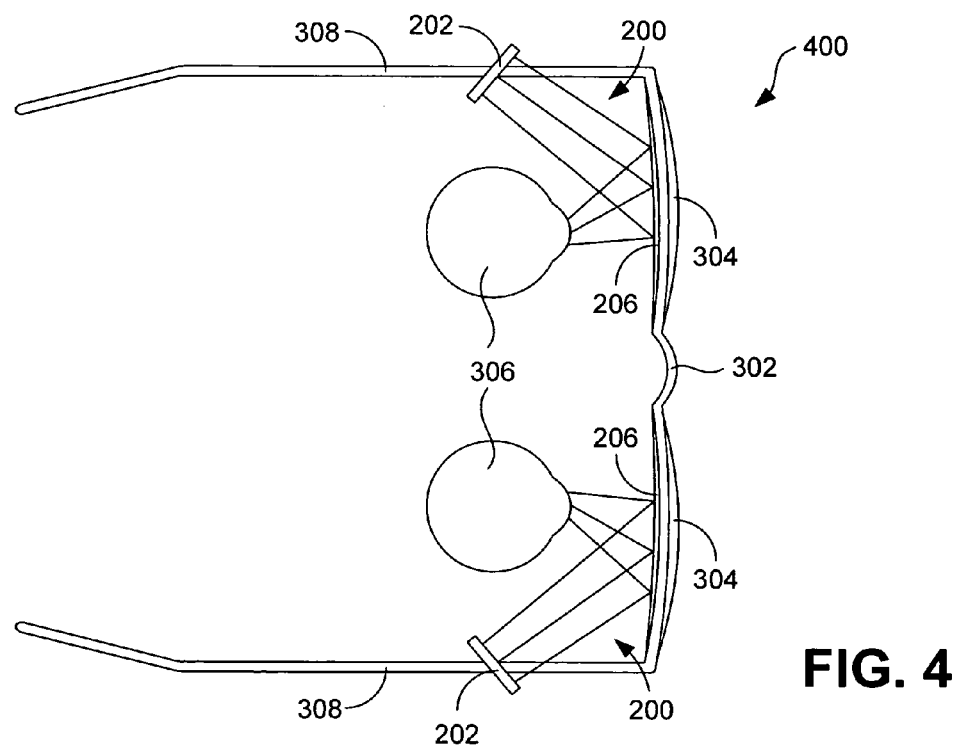
FIG. 4 is a second embodiment of an eyeglass-based display device that incorporates the imaging system of FIG. 2.

FIGS. 3 and 4 schematically illustrate integration of the imaging system 200 into eyeglasses. Beginning with FIG. 3, illustrated is an eyeglass-based display device 300 having a monocular arrangement in which a single imaging system 200 is incorporated with an eyeglass frame 302. Notably, the eyeglass frame 302 can comprise only a frame and exclude eyeglass lenses. Alternatively, as illustrated in FIG. 3, the frame 302 can comprise eyeglass lenses 304. In embodiments in which eyeglass lenses are not provided, the frame 300 supports the mirror 204 (FIG. 2) in front of one of the user's eyes 306. In embodiments in which eyeglass lenses 304 are provided, one of the lenses can comprise or support the partially-mirrored, non-rotationally symmetric surface 206. For example, an x-y polynomial surface can be formed on the inner surface of the lens. As is further indicated in FIG. 3, the microdisplay 202 is integrated into and/or mounted to one of the temples 308 of the frame 302. Such integration or mounting can be achieved in various ways as dictated by functional and aesthetic concerns.

In use of the display device 300, images generated by the microdisplay 202 are reflected by the partially-mirrored, non-rotationally symmetric surface 206 to one of the user's eyes 306. Again, because the partial mirror 204 is the sole optical element of the system 200, chromatic aberration does not occur. Due to the non-rotationally symmetric surface 206, monochromatic aberration is corrected at least to some degree.

FIG. 4 illustrates an eyeglass-based display device 400 having a binocular arrangement in which two imaging systems 200 are incorporated with the eyeglass frame 302. As with the embodiment of FIG. 3, the eyeglass frame 302 can include or exclude eyeglass lenses 304. In embodiments in which eyeglass lenses 304 are provided, both of the lenses can comprise a partially-mirrored, non-rotationally symmetric surface 206, for example formed on the inner surface of the lenses.

In use of the display device 400, images generated by the microdisplays 202 are reflected by the partially-mirrored, non-rotationally symmetric surfaces 206 to both of the user's eyes 306. As with the embodiment of FIG. 3, chromatic aberration does not occur and monochromatic aberration is corrected at least to some degree.

Figure 5:
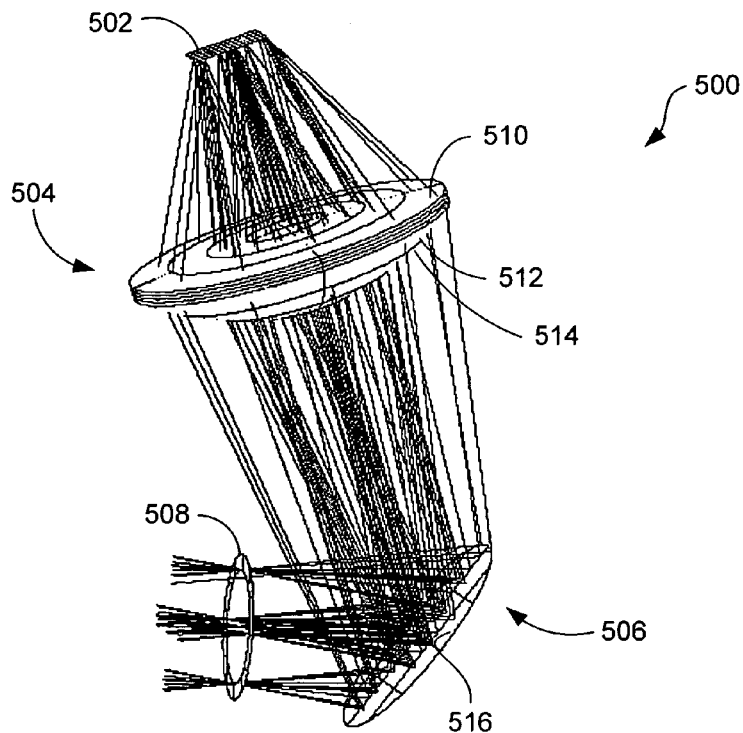
FIG. 5 is a third embodiment of an imaging system designed for use in an eyeglass-based display device.

Imaging systems for use in HMDs such as eyeglass-based display devices are typically designed to accommodate a range of eye movement. The eye motion requirement combined with a desire to achieve good image quality provide motivation for designs that comprise more than only a single optical element until new surface types are available. FIG. 5 illustrates an off-axis, two-element imaging system 500 intended for use in an eyeglass-based display device. As indicated in FIG. 5, the system 500 comprises an image source 502, in the form of a microdisplay, a lens 504 that helps correct optical aberrations, and a partial mirror 506 that reflects images generated by the microdisplay and transmitted by the lens to an exit pupil 508 of the system. In some embodiments, the partial mirror 506 in combination with the lens 504 minimizes optical aberrations.

The microdisplay 502 can comprise any suitable display technology. Examples of such technologies include a liquid crystal display (LCD), a liquid crystal on silicon (LCOS) display, a light emitting diode (LED) display, an organic light emitting diode (OLED) display, or another emissive, transmissive, or reflective display technology.

The lens 504 is formed as a thick lens having two surfaces: a spherical surface 510 and an aspheric surface 512. In one embodiment, the aspheric surface is a 12th order aspheric surface. Formed on the aspheric surface 512 is a diffractive optical element 514 that corrects chromatic aberration created by refraction of light rays when they pass through the lens 504. The contours of the diffractive optical element 514 can be fabricated in discrete steps using lithographic techniques, diamond turning, laser writing, as well as electron-beam lithography. Notably, the diffractive optical element can be provided within the system 500 as an element separate from the lens 504, if desired.

The partial mirror 506 comprises a freeform, non-rotationally symmetric surface 516, for example configured as an x-y polynomial surface. Again, other non-rotationally symmetric surfaces can be used, such as those described in the foregoing. In one embodiment, the non-rotationally symmetric surface 516 comprises a 4th order x-y polynomial surface. The following are specifications for one example imaging system implementation that incorporates the above-described characteristics:

Lens
  Center thickness: 8.5 mm
  Spherical surface
    Diameter: 27.26 mm
    Base radius of curvature: 58.6500010865252
  Aspheric surface
    Diameter: 27.76 mm
    Plastic: 'Z-E48R' Zeonex Grade E48R (glass code: 530.558)
    Plastic transmission: 1400 to 400 nm
      Surface type: aspheric
      Base radius of curvature: −23.025581910576
      k (conic constant):

$$z = \frac{c \cdot r^2}{1+\sqrt{1-(1+k)\cdot c^2 \cdot r}} + A*r^4 + B*r^6 + C*r^8 + D*r^{10} + E*r^{12}$$

where:

A: $0.144767E\text{-}04$,
B: $0.155208E\text{-}08$,
C: $0.396799E\text{-}10$,
D: $0.981797E\text{-}13$, and
E: $-.220386E\text{-}15$ Diffractive Optical Element
  Diffraction order: 1
  Construction wavelength: 558.98 nm Expression for the rotationally symmetric diffractive element:

$$c1*r^2 + c2*r^4 + c3*r^6 + c4*r^8$$

where:
  C1: −9.1244E-04,
  C2: −4.7675E-08,
  C3: 1.5135E-09, and
  C4: −6.1228E-12

Partial Mirror
  Mirror thickness: 3 mm
  Mirror material: PMMAO (polymethylmethacrylate)
  Back surface of the mirror is flat (infinite surface radius of curvature)
  Diameter: 19.55 mm
  Surface type: X-Y Polynomial
  Surface radius: −23.3469267964413
  Number of terms: 10
  k (conic constant)=−9.4545E-01
Expression for the X-Y Polynomial:

$$z = \frac{c \cdot r^2}{1+\sqrt{1-(1+k)\cdot c^2 \cdot r^2}} + xc*X + yc*Y + x2c*X^2 + xyc*X*Y + y2c*Y^2 + x3c*X^3 + x2yc*X^2*Y + xy2c*X*Y^2 + y3c*Y^3 + x4c*X^4$$

where:

| K:    | −9.4545E-01 |
| X c:  | −2.4589E-05 |
| Y c:  | −3.6107E-03 |
| X2c:  | 2.1417E-02  |
| XYc:  | 1.0188E-06  |
| Y2c:  | 2.1432E-02  |
| X3c:  | 6.8393E-07  |
| X2Yc: | 5.5693E-07  |
| XY2c: | 1.2079E-06  |
| Y3c:  | 1.4077E-07  |
| X4c:  | 3.7421E-07  |

In one embodiment in which the imaging system components have the above specifications, the center of the partial mirror 506 is positioned 20 mm away from the center of the pupil 508 with the mirror tilted at an angle of 34° relative to the pupil; the aspheric surface 512 of the lens 504 is positioned 29.51 mm away from the center of the partial mirror 506; the center of the fold mirror 702 is positioned 9 mm from the vertex of the lens 504; and the center of the microdisplay 502 is positioned 14 mm away from the center of the fold mirror 702.

Figure 6:
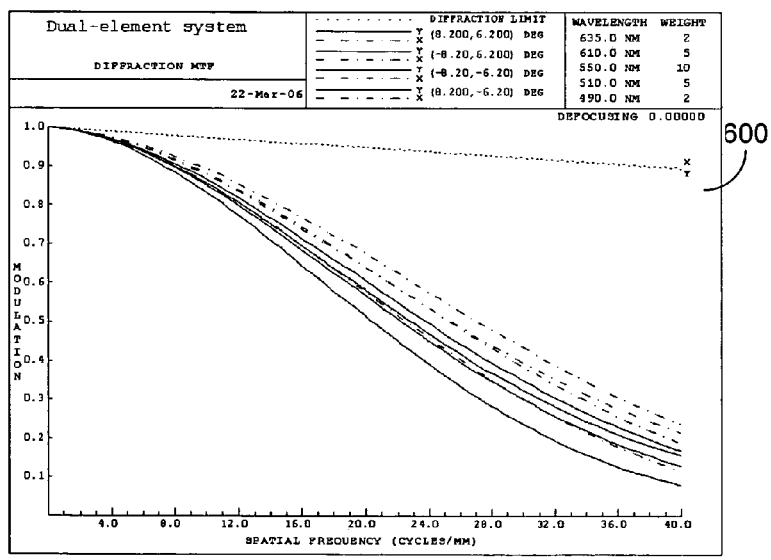
FIG. 6 is a graph of the modulation transfer function for the imaging system of FIG. 5, evaluated at the edge fields.

With the above-described configuration, the imaging system 500 provides high-quality images to the observer across an 8 mm exit pupil with observed full fields of view of approximately 16.4° in the x direction, 12.4° in the y direction, and approximately 20° in the diagonal direction. FIG. 6 provides a graph 600 of the modulation transfer function (MTF) for the system 500. As is apparent from that figure, the system 500 achieves 10% contrast at 40 cycles/mm, and light is visible across the entire frequency spectrum as limited by the pixel spacing on the microdisplay.

Figure 7:
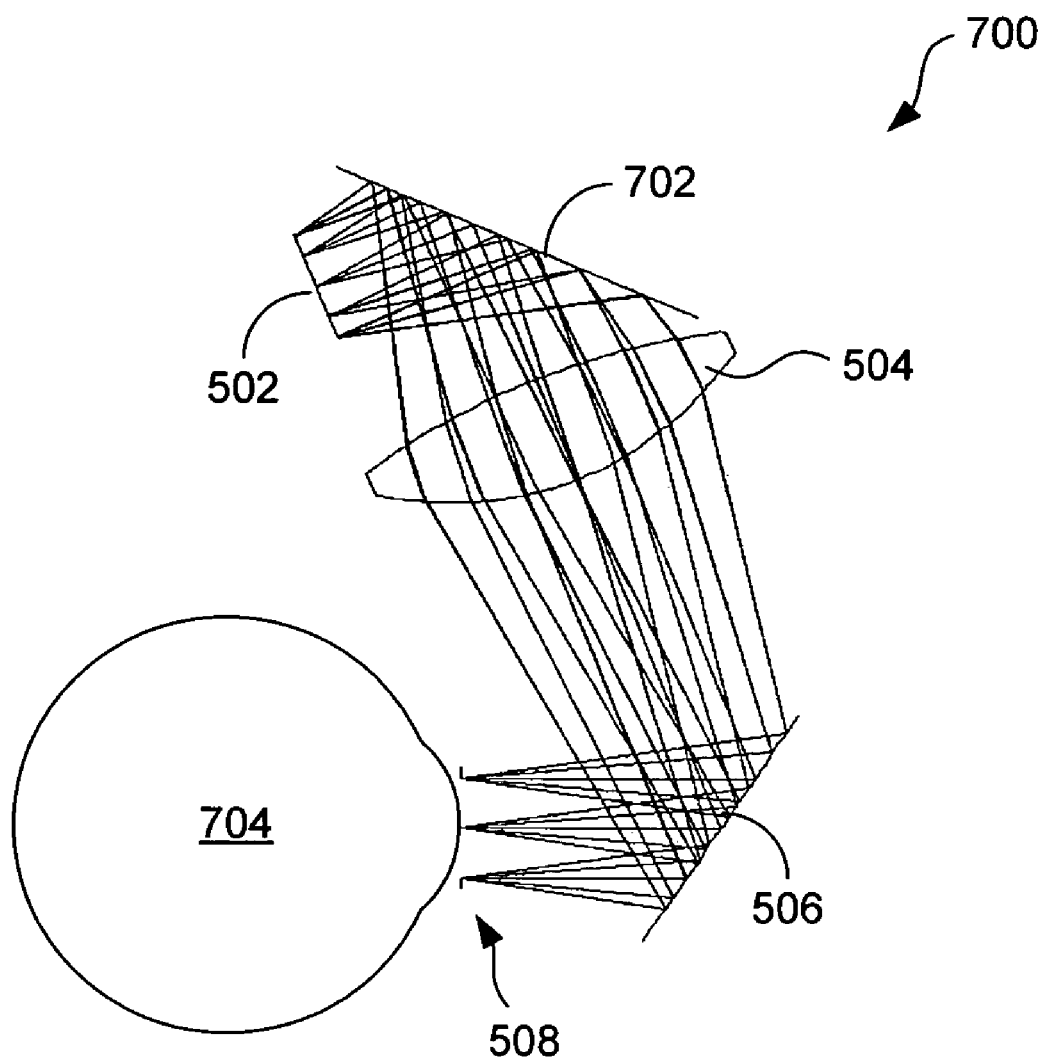
FIG. 7 is a fourth embodiment of an imaging system designed for use in an eyeglass-based display device.

FIG. 7 illustrates a modified embodiment of the imaging system of FIG. 5. The imaging system 700 of FIG. 7 comprises the components of the system 500, including the image source 502, the lens 504, and the partial mirror 506. Each of those components has configurations similar to those described above and, therefore, will not be described again. In addition to those components, the imaging system 700 includes a fold mirror 702 that is used to reconfigure the system to more easily fit within the form factor of conventional eyeglasses or sunglasses. As shown in FIG. 7, the system 700 is used to form images at the exit pupil 508 adjacent the eye 704 of the observer.

Figure 8:
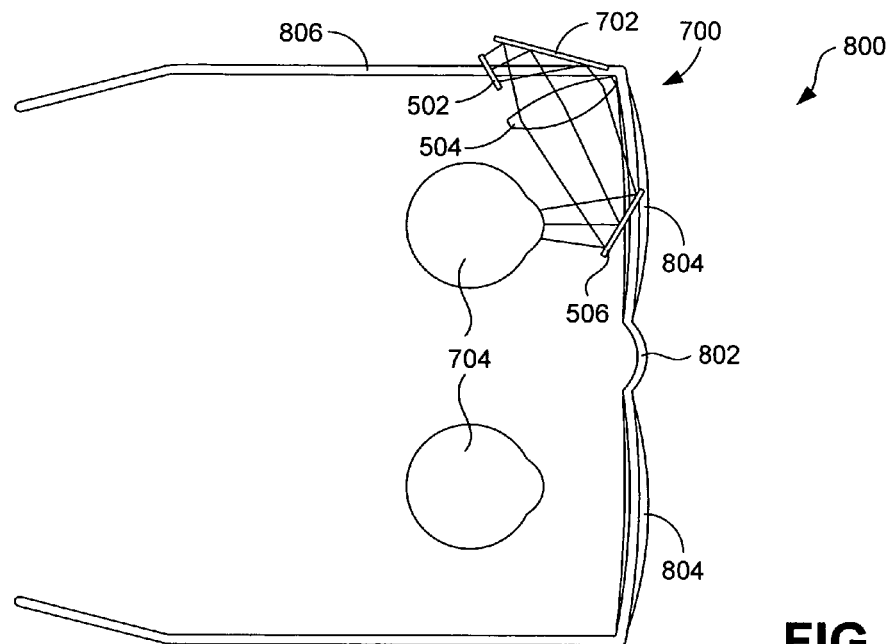
FIG. 8 is a first embodiment of an eyeglass-based display device that incorporates the imaging system of FIG. 7.
Figure 9:
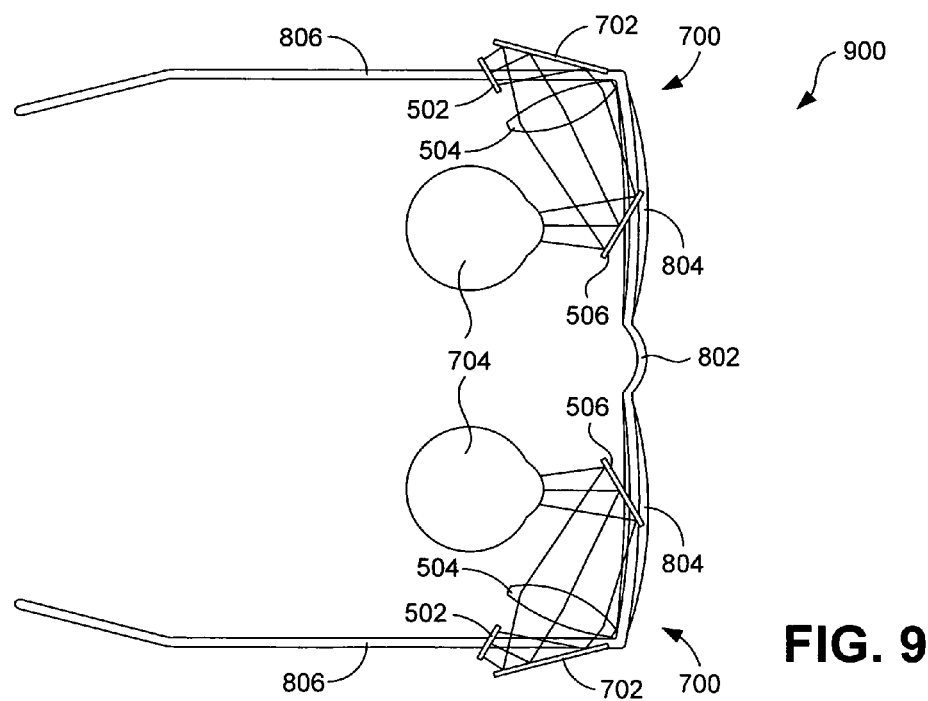
FIG. 9 is a second embodiment of an eyeglass-based display device that incorporates the imaging system of FIG. 7.

FIGS. 8 and 9 schematically illustrate integration of the imaging system 700 into eyeglasses. Beginning with FIG. 8, illustrated is an eyeglass-based display device 800 having a monocular arrangement in which a single imaging system 700 is incorporated with an eyeglass frame 802. As with previous embodiments, the eyeglass frame 802 can either include or exclude eyeglass lenses. In FIG. 8, the display device 800 is shown as including two eyeglass lenses 804.

The various components of the imaging system 700 are mounted to the features of the frame 802 and/or lenses 804. For example, the microdisplay 502 and the fold mirror 702 are integrated with and/or mounted to a temple 806 of the frame 802. The system lens 504 is positioned within the general boundary defined by the frame 802 and can be fixed in that position by mounting the lens to the frame 802 using appropriate mounting elements (not shown). Finally, the partial mirror 506 is positioned in front of one of the observer's eyes 704. The mirror 506 can be supported by an appropriate mounting element secured to or extending from the frame 802, can be mounted on the eyeglass lens 804 (where provided), or a combination of these mounting methods. In alternative embodiments, the partial mirror 506 may comprise part of the eyeglass lens 804. For example, the partial mirror 506 can be formed on the inner surface of the lens 804, the outside surface of the lens, or within the lens. It is noted that, although integration of the imaging system 700 into the eyeglasses can be achieved in various ways as dictated by functional and aesthetic concerns, more important than the precise manner in which such integration is achieved is that the imaging system 700 is compact enough to enable that integration.

In use of the display device 800, images generated by the microdisplay 502 are reflected by the fold mirror 702 to the lens 504, transmitted to the partial mirror 506, and then reflected to the eye 704.

FIG. 9 illustrates an eyeglass-based display device 900 having a biocular or binocular arrangement in which a two imaging systems 700 are incorporated with the eyeglass frame 802. As with the embodiment of FIG. 8, the eyeglass frame 802 can include or exclude eyeglass lenses 804. Similarly, the various components of the imaging systems 700 are positioned within the general boundary defined by the frame 802. The microdisplays 502 and fold mirrors 702 are integrated with and/or mounted to temples 806 of the frame 802, while the lenses 504 are fixed in position by mounting those lenses to the frame using appropriate mounting elements (not shown). Finally, the partial mirrors 506 are positioned in front of the observer's eyes 704 and are supported by appropriate mounting elements secured to or extending from the frame 802 and/or mounted on the eyeglass lenses 804 (where provided). Alternatively, the partial mirrors 506 may comprise part of the eyeglass lenses 804 as described above in relation to FIG. 8. Again, less important is the particular manner in which the imaging systems are incorporated into the eyeglasses. More important is that the imaging systems 700 are compact enough to enable such incorporation.

In use of the display device 900, images generated by the microdisplays 502 are reflected by the fold mirrors 702 to the lenses 504, transmitted to the partial mirrors 506, and then reflected to the eyes 704.

Figure 10:
FIG. 10 is a three-dimensional representation of a vertical implementation of the imaging system of FIG. 7.

FIG. 10 is a three-dimensional representation of a vertical implementation of the imaging system 700 of FIG. 7. Whereas the previous embodiments were horizontal implementations in which the imaging system 700 is generally positioned laterally to the eye(s), the implementation of FIG. 10 is vertical in that the imaging system is generally positioned above the eye. The principles described above in relation to the horizontal implementations are the same for the vertical implementation shown in FIG. 10.

Figure 11:
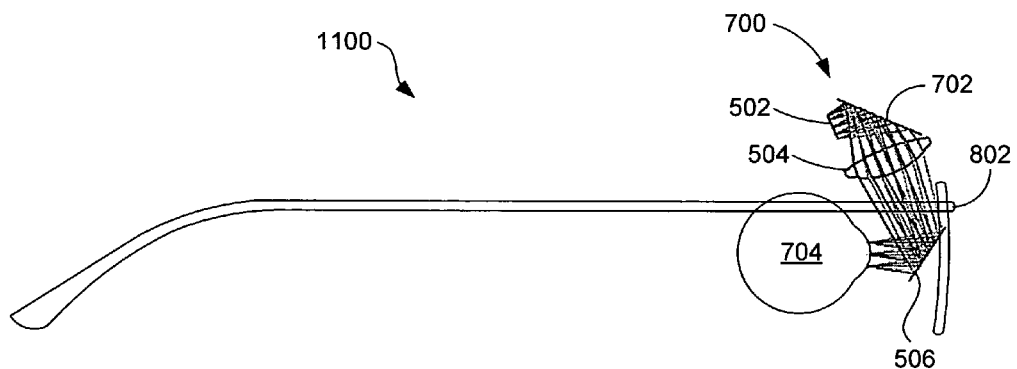
FIG. 11 is a third embodiment of an eyeglass-based display device that incorporates the imaging system of FIG. 7.
Figure 12:
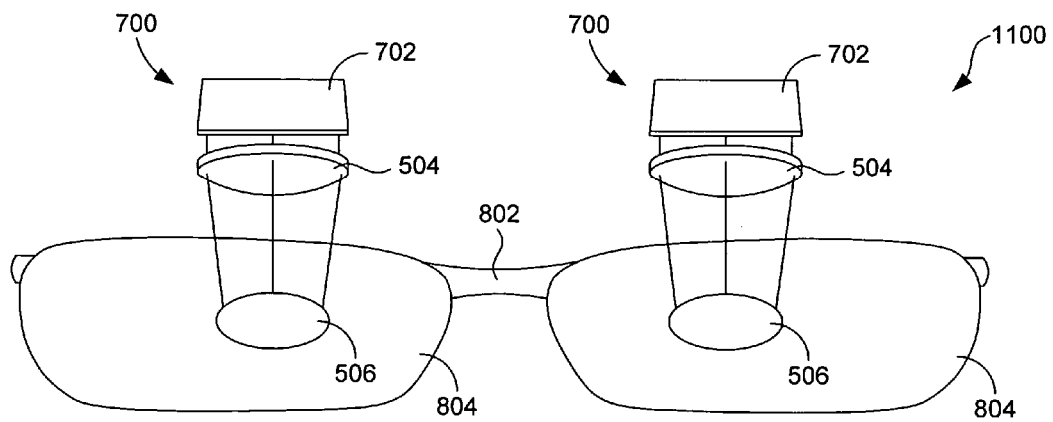
FIG. 12 is a fourth embodiment of an eyeglass-based display device that incorporates the imaging system of FIG. 7.

FIGS. 11 and 12 schematically illustrate embodiments of an eyeglass-based display device 1100 that incorporates the imaging system 700 in a vertical implementation. As with the previously-described devices, the display device 1100 comprises eyeglasses including a frame 802, and possibly comprising eyelenses lenses 804 (FIG. 12). The display device 1100 can comprise a single imaging system 700 or, as specifically depicted in FIG. 12, the device can comprise two such imaging systems 700, one imaging system for each eye 704.

Figure 13:
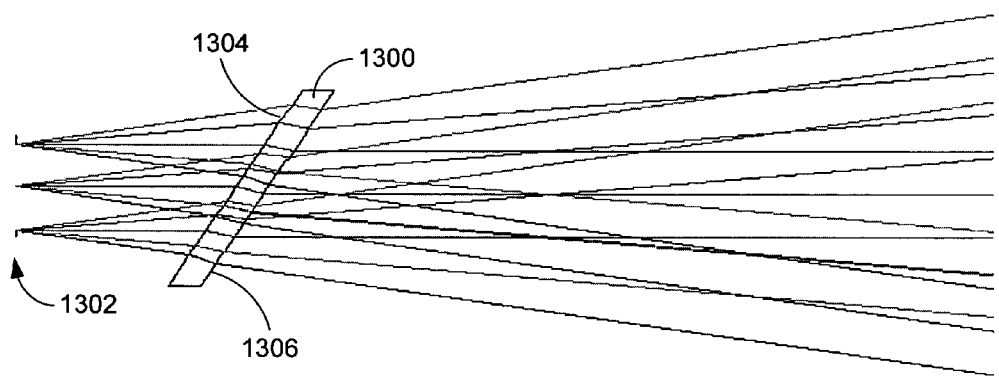
FIG. 13 is a fifth embodiment of an imaging system designed for use in an eyeglass-based display device.

In the foregoing, the partial mirrors have been described as comprising a freeform, non-rotationally symmetric surface, such as an x-y polynomial surface, that reflects light. It is to be appreciated that a complementary surface can be formed on the opposite side of the partial mirrors to counteract distortion to scenes viewed by the observer through the partial mirror due to the non-rotationally symmetric surface. Such an arrangement is illustrated in FIG. 13. As shown in that figure, a partial mirror 1300 is provided and light rays from an observed scene (not shown) pass through the partial mirror to the exit pupil 1302 defined by an imaging system (not shown) in which the partial mirror is used. As depicted in FIG. 13, an inner surface 1304 (e.g., towards the pupil 1302) of the partial mirror 1300 comprises a freeform, non-rotationally symmetric surface, for example an x-y polynomial surface. Again, the surface 1304 can comprise another non-rotationally symmetric surface, such as a spline or a zernike (e.g., extended-fringe zernike) polynomial surface. More generally, however, substantially any linear combination of a complete and orthogonal set of basis functions can be used to form the surface 1304. In addition, the outside or opposite surface 1306 of the partial mirror 1300 comprises a complementary free-form, non-rotationally symmetric surface, for example a complementary x-y polynomial surface. With such an arrangement, the opposite surface 1306 reverses the distortion created by the inside surface 1304 so that, optically speaking, the partial mirror behaves as a substantially planar partial mirror for real-world scenes viewed by the observer.

As stated above, while particular embodiments have been described in this disclosure, alternative embodiments are possible. Furthermore, it is noted that although the disclosed imaging systems are described as being integrated into "eyeglasses," it is to be understood that it is not intended to limit application of the imaging systems to existing eyeglass designs. Instead, eyeglasses may be specially designed to support the disclosed imaging systems. Moreover, although the terms "eyeglasses" and "eyeglass-based" are used, it is to be understood that those terms are not intended to limit the application of the imaging systems to conventional eyeglasses. Instead, applicant is generally referring to apparatus that can be worn on the head and/or face in similar manner to eyeglasses and project images to one or more of the wearer's eyes, regardless of the particular configuration of the apparatus.

The invention claimed is:

1. An imaging system comprising:
   an image source; and
   a partial mirror that defines a non-rotationally symmetric surface comprising an x-y polynomial surface;
   wherein the partial mirror reflects images generated by the image source to an eye of an observer.

2. The imaging system of claim 1, wherein the image source is a microdisplay.

3. The imaging system of claim 1, wherein the non-rotationally symmetric surface is a 4th order x-y polynomial surface.

4. The imaging system of claim 1, wherein the system comprises no other optical elements.

5. The imaging system of claim 1, further comprising a lens that aids in correcting optical aberration.

6. The imaging system of claim 5, wherein the lens comprises an aspheric surface.

7. The imaging system of claim 6, wherein the aspheric surface comprises a 12th order aspheric surface.

8. The imaging system of claim 6, further comprising a diffractive optical element that corrects chromatic aberration.

9. The imaging system of claim 6, wherein the system comprises no other optical elements.

10. The imaging system of claim 1, further comprising a complementary non-rotationally symmetric surface that reverses distortion created by the non-rotationally symmetric surface.

11. A two-element, off-axis imaging system for an eyeglass-based display device, the imaging system comprising:
    an image source that generates images for an observer;
    a lens that aids in correcting optical aberration; and
    a partial mirror that defines an x-y polynomial surface that reflects the images to an eye of the observer;
    wherein the imaging system comprises no other optical elements.

12. The imaging system of claim 11, wherein the image source is a microdisplay.

13. The imaging system of claim 11, wherein the lens comprises an aspheric surface.

14. The imaging system of claim 13, wherein the aspheric surface comprises a 12th order aspheric surface.

15. The imaging system of claim 11, further comprising a diffractive optical element that corrects chromatic aberration.

16. The imaging system of claim 11, wherein the x-y polynomial surface is a 4th order x-y polynomial surface.

17. The imaging system of claim 11, further comprising a fold mirror that reflects the images generated by the image source to the lens.

18. The imaging system of claim 11, wherein the system provides the observer with a diagonal field of view of approximately 20°.

19. The imaging system of claim 11, further comprising a complementary x-y polynomial surface that reverses distortion created by the x-y polynomial surface.

20. A two-element, off-axis imaging system for an eyeglass-based display device, the imaging system comprising:
    a microdisplay that generates images for an observer;
    a lens that aids in correcting optical aberration, the lens having an aspheric surface;
    a diffractive optical element that corrects chromatic aberration;
    a fold mirror that reflects the images generated by the microdisplay to the lens; and
    a partial mirror that defines an x-y polynomial surface that reflects the images to an eye of an observer;
    wherein the imaging system comprises no other optical elements.

21. The imaging system of claim 20, further comprising a complementary x-y polynomial surface that reverses distortion created by the x-y polynomial surface.

22. An eyeglass-based display device comprising:
    an imaging system including an image source and a partial mirror that defines an x-y polynomial surface; and
    a frame that supports the imaging system in an orientation in which the partial mirror reflects images generated by the image source to an eye of an observer.

23. The display device of claim 22, wherein the imaging system generally fits within a form factor of the frame.

24. The display device of claim 22, wherein the image source is a microdisplay.

25. The display device of claim 22, wherein the x-y polynomial surface is a 4th order x-y polynomial surface.

26. The display device of claim 22, wherein the imaging system comprises no other optical elements.

27. The display device of claim 22, further comprising a lens that corrects that aids in correcting optical aberration.

28. The display device of claim 27, wherein the lens comprises an aspheric surface.

29. The display device of claim 28, wherein the aspheric surface comprises a 12th order aspheric surface.

30. The display device of claim 28, wherein the imaging system further comprises a diffractive optical element that corrects chromatic aberration.

31. The display device of claim 28, wherein the imaging system comprises no other optical elements.

32. The display device of claim 22, wherein the frame comprises an eyeglass frame that supports at least one eyeglass lens.

33. The display device of claim 22, wherein the display device comprises two imaging systems, one provided for each eye of the observer.

34. The display device of claim 22, further comprising a complementary x-y polynomial surface that reverses distortion created by the x-y polynomial surface.

35. An eyeglass-based display device comprising:
    a two-element, off-axis imaging system including
       a microdisplay that generates images for an observer,
       a lens that aids in correcting optical aberration, the lens having an aspheric surface,
       a diffractive optical element that corrects chromatic aberration,
       a fold mirror that reflects the images generated by the microdisplay to the lens, and
       a partial mirror that defines an x-y polynomial surface; and
    a frame that supports the imaging system in an orientation in which the partial mirror reflects images generated by the image source to an eye of the observer;
    wherein the imaging system comprises no other optical elements.

36. The display device of claim 35, wherein the imaging system generally fits within a form factor of the frame.

37. The display device of claim 35, wherein the display device comprises two imaging systems, one provided for each eye of the observer.

38. The display device of claim 35, further comprising a complementary x-y polynomial surface that reverses distortion created by the x-y polynomial surface.

* * * * *